US011698969B1

(12) United States Patent
Henriquez Garcia

(10) Patent No.: US 11,698,969 B1
(45) Date of Patent: Jul. 11, 2023

(54) BOOT SECURITY OF INTEGRATED CIRCUIT DEVICE

(71) Applicant: Amazon Technologies, Inc., Seattle, WA (US)

(72) Inventor: Rene Ernesto Henriquez Garcia, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 74 days.

(21) Appl. No.: 17/304,838

(22) Filed: Jun. 25, 2021

(51) Int. Cl.
*G06F 21/57* (2013.01)

(52) U.S. Cl.
CPC ...... *G06F 21/572* (2013.01); *G06F 2221/033* (2013.01)

(58) Field of Classification Search
CPC ........ G06F 21/57; G06F 21/575; G06F 21/64; G06F 21/50; G06F 21/51; G06F 21/52; G06F 21/572; G06F 21/44; G06F 2221/033; G06F 2221/034; G06F 11/1417
See application file for complete search history.

(56) References Cited

U.S. PATENT DOCUMENTS

| | | | | |
|---|---|---|---|---|
| 6,601,175 B1* | 7/2003 | Arnold | ..................... | G06F 21/31 713/184 |
| 11,314,518 B2* | 4/2022 | Macchetti | ................ | G06F 21/72 |
| 2005/0251708 A1* | 11/2005 | Bancel | ..................... | G06F 21/71 714/49 |
| 2008/0170694 A1* | 7/2008 | Ryan | ........................ | G06F 21/51 726/22 |
| 2012/0233446 A1* | 9/2012 | Gammel | ............... | G06F 9/4812 712/E9.06 |
| 2014/0082329 A1* | 3/2014 | Ghose | ................... | G06F 21/566 712/208 |
| 2015/0309088 A1* | 10/2015 | Qaiyum | ........... | G01R 19/16528 324/762.01 |
| 2018/0089422 A1* | 3/2018 | Kounavis | .............. | G06F 21/563 |

(Continued)

FOREIGN PATENT DOCUMENTS

| | | | | |
|---|---|---|---|---|
| EP | 4002165 A1 * | 5/2022 | | |
| WO | WO-0197010 A2 * | 12/2001 | ............. | G06F 21/52 |
| WO | WO-2021262161 A1 * | 12/2021 | | |

OTHER PUBLICATIONS

E. Aktas, F. Afram and K. Ghose, "Continuous, Low Overhead, Run-Time Validation of Program Executions," 2014 47th Annual IEEE/ACM International Symposium on Microarchitecture, 2014, pp. 229-241, doi: 10.1109/MICRO.2014.18. (Year: 2014).*

S. Arnautov and C. Fetzer, "ControlFreak: Signature Chaining to Counter Control Flow Attacks," 2015 IEEE 34th Symposium on Reliable Distributed Systems (SRDS), 2015, pp. 84-93, doi: 10.1109/SRDS.2015.35. (Year: 2015).*

(Continued)

*Primary Examiner* — Michael Simitoski
(74) *Attorney, Agent, or Firm* — Weaver Austin Villeneuve & Sampson LLP

(57) ABSTRACT

Techniques for measuring firmware at the point and time of execution are described. Hardware logic can be implemented in a processing unit that is tasked with executing firmware code to make on-the-fly measurements of the instructions being executed by the processing unit. For example, an instruction register that stores instructions being executed by the processing unit can be monitored to obtain a set of instructions corresponding to the firmware being executed. Firmware verification circuitry can be implemented to compute a cryptographic measurement of the instructions being executed to verify the authenticity of the firmware.

18 Claims, 9 Drawing Sheets

(56) References Cited

U.S. PATENT DOCUMENTS

| | | | |
|---|---|---|---|
| 2018/0173644 A1* | 6/2018 | Koeberl | G06F 12/1416 |
| 2018/0373863 A1* | 12/2018 | Domke | G06F 21/44 |
| 2019/0073478 A1* | 3/2019 | Khessib | G06F 13/4282 |
| 2020/0007329 A1* | 1/2020 | Guilford | H04L 9/3239 |
| 2020/0034540 A1* | 1/2020 | Husson | G06F 21/57 |
| 2020/0201714 A1* | 6/2020 | Montero | G06F 11/1469 |
| 2021/0019419 A1* | 1/2021 | Mathane | G06F 9/445 |
| 2021/0048850 A1* | 2/2021 | Hsia | G06F 1/1632 |
| 2021/0182393 A1* | 6/2021 | Chevalier | G06F 21/52 |
| 2021/0240545 A1* | 8/2021 | Kumar | G06F 9/4406 |
| 2021/0344499 A1* | 11/2021 | Troia | G06F 11/0736 |
| 2022/0035926 A1* | 2/2022 | Tsai | G06F 21/62 |
| 2022/0052436 A1* | 2/2022 | Yang | H04B 1/401 |
| 2022/0188423 A1* | 6/2022 | Ndu | G06F 21/552 |
| 2022/0200807 A1* | 6/2022 | Pattamatta | G06F 21/57 |

OTHER PUBLICATIONS

A. Chaudhari and J. A. Abraham, "Effective Control Flow Integrity Checks for Intrusion Detection," 2018 IEEE 24th International Symposium on On-Line Testing and Robust System Design (IOLTS), 2018, pp. 1-6, doi: 10.1109/IOLTS.2018.8474130. (Year: 2018).*

J. -L. Danger et al., "CCFI-Cache: A Transparent and Flexible Hardware Protection for Code and Control-Flow Integrity," 2018 21st Euromicro Conference on Digital System Design (DSD), 2018, pp. 529-536, doi: 10.1109/DSD.2018.00093. (Year: 2018).*

A. K. Kanuparthi, R. Karri, G. Ormazabal and S. K. Addepalli, "A high-performance, low-overhead microarchitecture for secure program execution," 2012 IEEE 30th International Conference on Computer Design (ICCD), 2012, pp. 102-107, doi: 10.1109/ICCD.2012.6378624. (Year: 2012).*

\* cited by examiner

BOOT SECURITY OF INTEGRATED CIRCUIT DEVICE

BACKGROUND

Firmware provides low-level control to an electronic device's hardware, and acts as an interface between the hardware and higher-level software such as an operating system and application programs. For example, in the context of a computer, firmware such as BIOS (basic input/output system) initializes the computer's input/output (I/O) devices to allow the I/O devices to control the computer and load the operating system. Because firmware is often the first piece of code executed by an electronic device, malicious code injected into the firmware can yield complete control of the device to the malicious code. Restarting the device may not remedy the situation, because the malicious code is still executed each time the device is restarted.

BRIEF DESCRIPTION OF THE DRAWINGS

Various embodiments in accordance with the present disclosure will be described with reference to the drawings, in which.

DETAILED DESCRIPTION

To ensure that a device's firmware is authentic and does not contain malicious code or has been corrupted otherwise, the firmware code stored in non-volatile memory can be verified before being allowed to execute. For example, a trusted component of the system can read the firmware from non-volatile memory, take a measurement of the firmware (e.g., generate a signature), and release the firmware for execution if the measurement matches a known-good value. Another technique is to allow the firmware to execute, but provide the firmware measurement to a trusted platform module for subsequent attestation to determine whether the device executed authentic firmware. The result of the attestation can be used to modify the manner in which the device is integrated into the computing environment based on the security policies implemented. For example, if the result of the attestation indicates that the device may have executed unknown firmware, the device can be restricted from accessing certain resources such as a network interface or certain memory storage regions. However, even with such security measures in place, the firmware is still susceptible to time-of-check to time-of-use (TOCTOU) types of attacks. For example, there can be a window of time between when the firmware measurement is taken and when the firmware is actually executed to allow malicious code to be injected without detection.

The techniques disclosed herein provide a security mechanism to detect such attacks by measuring the firmware at the point and time of execution. Hardware logic can be implemented in a processing unit (e.g., processor, controller, etc.) that is tasked with executing the firmware code to make on-the-fly measurements of the actual instructions being executed by the processing unit. For example, an instruction register that stores instructions being executed by the processing unit can be monitored to obtain a set of instructions corresponding to the firmware being executed. By generating the firmware measurement from these instructions at the point of execution, the window of opportunity for injection of malicious code for TOCTOU types of attacks can be effectively eliminated. In complex systems with multiple devices having their own respective firmware stored in different non-volatile memory devices, measuring the firmware at the time of execution can also speed up the boot process by eliminating the overhead and latency of having to wait for all memory devices to be read to verify the respective firmware code.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
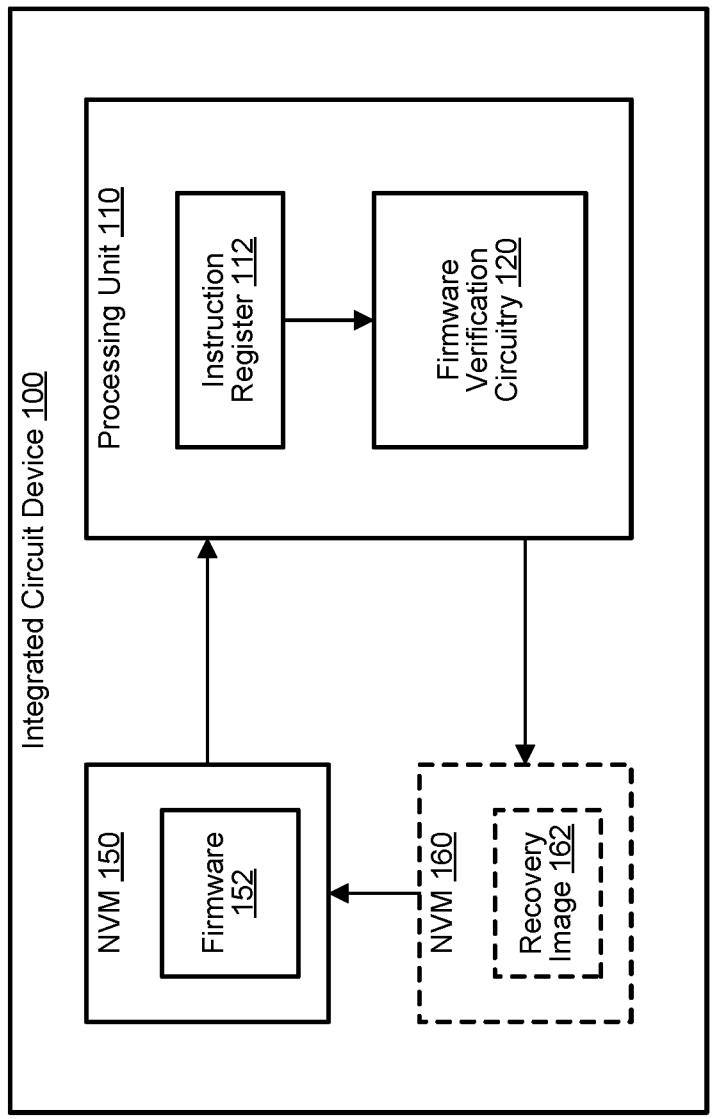
FIG. 1 illustrates an example of an integrated circuit device, according to certain aspects of the disclosure.

FIG. 1 illustrates a block diagram of an example of an integrated circuit device 100 that can employ the firmware verification techniques disclosed herein. Integrated circuit device 100 can be used to implement a variety of devices including computing devices or systems such as servers, computers, laptops, etc.; computing or communication components such as system-on-chips (SoCs), network interface cards, graphics cards, audio cards, memory cards, power supply modules, etc.; portable electronics such as tablets, mobile phones, wearable devices, portable media players, etc.; peripheral devices such as displays, speakers, cameras, storage devices, hubs, docking stations, keyboards, pointer device, etc.; internet-of-things (IoT) devices such as home automation devices, personal assistant devices, sensor systems, appliances, etc.; home electronics such as set-top boxes, gaming consoles, media players, televisions, etc.; networking devices such as routers, gateways, repeaters, etc.; or other types of electronic devices or integrate circuit devices that execute firmware code.

Integrated circuit device 100 includes a processing unit 110, a non-volatile memory 150, and may include other components not specially shown. Processing unit 110 can be a processor, a controller, a graphics processing unit, a tensor processing unit, a neural network processor, a digital signal processor, a network processor, a cryptoprocessor, a field programmable gate array, or other types of application specific integrated circuit (ASIC) or other processing logic circuitry that can execute machine instructions. Non-volatile memory 150 can be implemented using erasable programmable read-only memory (EPROM), electrically erasable programmable read-only memory (EEPROM), flash memory, or the like. Non-volatile memory 150 can be used to store firmware 152 that is executed during a startup process of integrated circuit device 100. In some implementations, non-volatile memory 150 can be used as a boot ROM. In some implementations, firmware 152 can be stored elsewhere (e.g., on another component or device, over the network, etc.), and be provided to integrated circuit device 100 during startup over a communication interface (e.g., serial peripheral interface (SPI), universal asynchronous receiver/transmitter (UART), Inter-Integrated Circuit (I2C), or the like).

Firmware 152 may include firmware code to initialize and set up the hardware components of integrated circuit device 100, and to load higher-level software such as a kernel, operating system, hypervisor, etc., or the like. For example, firmware 152 may include code to initialize interrupts for an I/O interface of processing unit 110, and may include code that points to a memory location where an operating system is stored such that the operating system can be loaded during startup from that memory location. Firmware 152 may also include code to train (e.g., synchronize timing) and initialize volatile memory interface used to load higher-level software, turn on power domains in the motherboard to bootstrap other subcomponents residing on the platform, train and enable platform buses to initiate communication with other engines or components in the system, etc. Examples of firmware 152 can include platform level firmware such as BIOS firmware, baseboard management controller (BMC) firmware, host bus adapter (HBA) firmware, system control processor (SCP) firmware, ARM trusted firmware (ATF), Unified Extensible Firmware Interface (UEFI) or EFI compliant firmware, etc. Depending on the type of integrated circuit device being implemented, other types of firmware suitable for the integrated circuit device can alternatively be used.

In some implementations, integrated circuit device 100 (or a system that includes integrated circuit device 100) may have multiple pieces of firmware stored in one or more non-volatile memories. In such implementations, integrated circuit device 100 may not be fully functional until the multiple pieces of firmware have been executed. Some devices may execute the multiple pieces of firmware in a certain order, and a boot management component such as a complex programmable logic device (CPLD) can be used to manage the boot sequence and handoff between the pieces of firmware.

During a startup operation (e.g., responsive to a reset or power-on event), processing unit 110 accesses non-volatile memory 150 (or a communication interface) to read the firmware code of firmware 152. The firmware code can be translated or decoded into machine or processor instructions for processing unit 110 to execute. For example, the firmware code can be decoded into opcodes and operands corresponding to assembly instructions used by processing unit 110. The set of instructions corresponding to firmware 152 can be sequentially stored in an instruction register 112 of processing unit 110 for execution. For example, instruction register 112 can be part of a shift register or an instruction buffer that temporary stores an instruction pending or during execution by processing unit 110. In some implementations, instruction register 112 can be part of the instruction pipeline of processing unit 110. Once the instruction is executed (e.g., in the next clock cycle, or a short time period after the instruction has been executed), the instruction can be removed from instruction register 112 and be replaced with the next instruction.

Processing unit 110 also includes firmware verification circuitry 120 coupled to instruction register 112. For example, firmware verification circuitry 120 may include an input that is coupled to the contents of instruction register 112. It should be noted that although firmware verification circuitry 120 is shown as being integrated within processing unit 110, firmware verification circuitry 120 can also be external to processing unit 110 so long as firmware verification circuitry 120 has access to the contents of instruction register 112.

Firmware verification circuitry 120 can obtain the set of instructions corresponding to firmware 152 from instruction register 112 and compute a cryptographic measurement of firmware 152. In some implementations, firmware verification circuitry 120 computes the cryptographic measurement on-the-fly by updating an intermediate measurement value each time a new instruction is written into instruction register 112. For example, the intermediate measurement value can be stored in an accumulation register, and the value stored in the accumulation register can be updated each time instruction register 112 stores a new instruction pertaining to firmware 152.

In some implementations, an instruction stored in instruction register 112 can be consumed by firmware verification circuitry 120 only after the instruction has been successfully executed. This can provide additional assurance that the instructions being used in the cryptographic measurement computation are instructions that have been executed by processing unit 110. In such implementations, a signal such as a general-purpose input/output (GPIO) signal or an interrupt signal from processing unit 110 can be used to indicate to firmware verification circuitry 120 that the instruction has been executed, and that the instruction can be included in the cryptographic measurement computation.

When all instructions corresponding to firmware 152 has been executed, the value stored in the accumulation register can be used as the cryptographic measurement of firmware 152. The cryptographic measurement of firmware 152 computed by firmware verification circuitry 120 can then be compared with an expected signature of firmware 152 to determine if firmware 152 has been altered. Because the cryptographic measurement of the firmware is taken at the point of execution, the firmware that processing unit 110 executed is the same firmware measured by firmware verification circuitry 120. As such, TOCTOU types of attacks can be effectively eliminated.

In some implementations, integrated circuit device 100 can optionally include a non-volatile memory 160 that stores a recovery image 162. Non-volatile memory 160 can be a lightweight (small capacity) memory component. In some implementations, non-volatile memory 160 can be implemented as part of the boot management CPLD. Recover image 162 may include code that can be executed by processing unit 110 to restore integrated circuit device 100 into a known-good state. For example, recovery image 162 may provide instructions for processing unit 100 to access a remote storage location to obtain valid firmware to restore integrated circuit device 100, or provide an operating environment to allow a user to manually update the firmware stored in non-volatile memory 150. In the event that the cryptographic measurement of firmware 152 computed by firmware verification circuitry 120 mismatches the expected signature of firmware 152, firmware verification circuitry 120 may send a recovery signal to non-volatile memory 160 to replace firmware 152 in non-volatile memory 150 with recovery image 162. In this manner, upon reset of integrated circuit device 100, recovery image 162 is executed to allow integrated circuit device 100 to obtain valid firmware to replace the previously corrupted firmware.

Figure 2A:
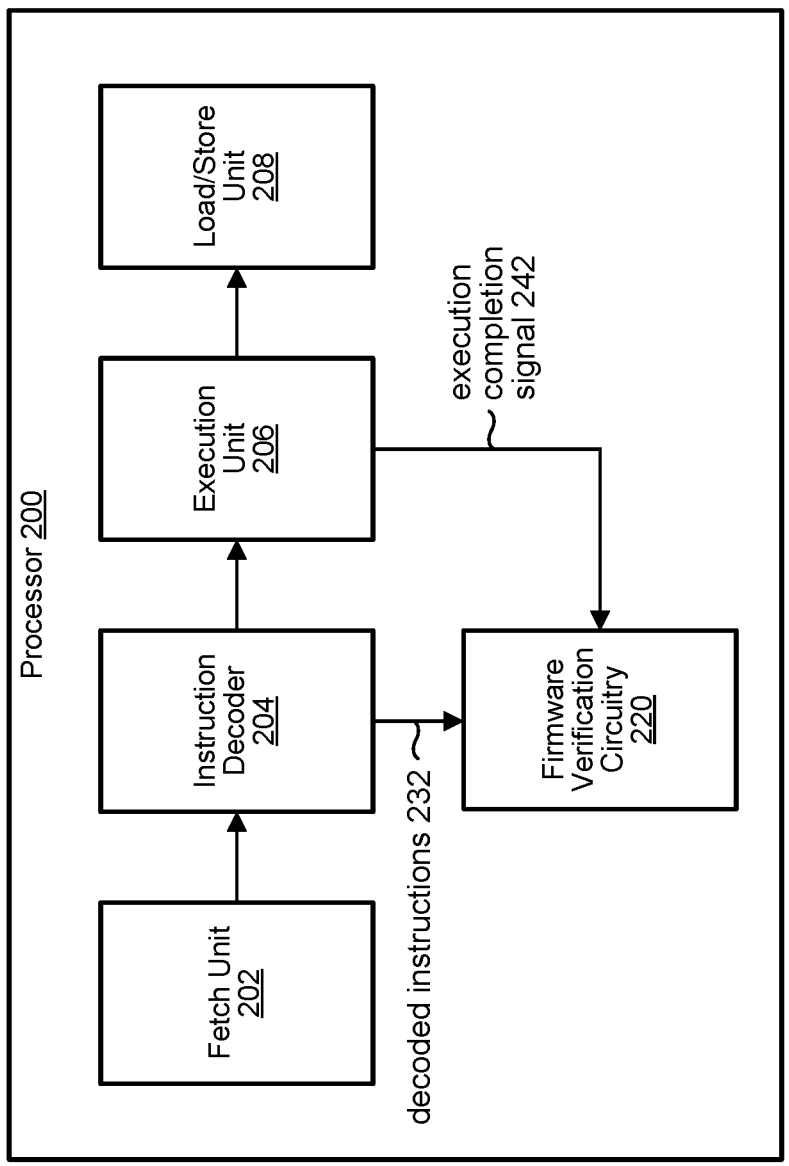
FIG. 2A illustrates an example of a processor, according to certain aspects of the disclosure.

FIG. 2A illustrates a block diagram of an example of a processor 200 of an integrated circuit device. In some implementations, processor 200 can be used as processing unit 110. Processor 200 may utilize instruction pipelining by splitting up the processing of incoming instructions into a series of sequential steps performed by different components of processor 200. For example, processor 200 may implement a 4-stage pipeline that includes fetch, decode, execute, and load/store stages. In other implementations, processor 200 may employ fewer or more pipeline stages, divide up one or more pipeline stages, and/or combine two or more pipeline stages.

Processor 200 may include a fetch unit 202, an instruction decoder 204, an execution unit 206, and a load/store unit 208, as well as additional components not specifically shown. Fetch unit 202 includes fetch circuitry that fetches or reads binary code from memory locations for processor 200 to execute. For example, as part of a boot sequence during startup, fetch unit 202 may read firmware from memory locations in a non-volatile memory. The binary code read from each memory location (e.g., memory address) may correspond to an instruction. In some implementations, fetch unit 202 can include an instruction cache and may maintain a program counter to track the number of instructions read. Fetch unit 202 can include an instruction register to store a pending instruction in the form of a binary code to provide to instruction decoder 204.

Instruction decoder 204 receives an instruction from fetch unit 202, and includes instruction decoder circuitry to decode the instruction to determine the action(s) to be taken by processor 200. For example, instruction decoder 204 may decode a binary code read from memory into a processor instruction (may also be referred to as a machine instruction). The processor instruction may include an opcode, and optionally one or more operands (depending on the opcode) to allow execution unit 206 to perform the proper operations. In some implementations, instruction decoder 204 may decode a complex instruction into multiple opcodes and corresponding optional operands. Instruction decoder 204 may also drop or discard unrecognizable or invalid instructions. Instruction decoder 204 can also include an instruction register to store the decoded instruction (e.g., opcode and optional operand(s)) as binary values to provide to execution unit 206. As part of the boot sequence during startup, instruction decoder 204 may decode the binary code read from the firmware into processor instructions, and the instruction register of instruction decoder 204 can sequentially store each of the processor instructions corresponding to the firmware for execution by execution unit 206.

Execution unit 206 can include a register file and execution circuitry such as one or more arithmetic logic units (ALUs). Execution unit 206 may sequentially receive and execute the processor instructions store in the instruction register of instruction decoder 204. For example, execution unit 206 may receive a decoded instruction from instruction decoder 204 in the form of an opcode and optional operand(s), and perform an operation such as a calculation or a logic operation using one or more ALUs. The result or the output of the ALUs is provided to load/store unit 208 to write back to memory or register. The combination of fetch unit 202, instruction decoder 204, execution unit 206, and load/store unit 208 forms the execution path or instruction pipeline of processor 200.

Processor 200 further includes firmware verification circuitry 220 (e.g., firmware verification circuitry 120). Firmware verification circuitry 200 can include an accumulation register, and is configured to sequentially perform, for each of the processor instructions corresponding to the firmware being executed during a boot sequence, a set of operations. The set of operations can include combining the processor instruction stored in the instruction register or processor 200 with a value stored in the accumulation register to generate a hash input value, applying a hash function to the hash input value to compute a hash value, and updating the accumulation register with the hash value. An accumulated hash value stored in the accumulation register corresponding to the last processor instruction of the firmware can be used as a cryptographic measurement of the firmware to verify that the firmware executed by processor 200 is valid and has not been tampered with.

In the example shown in FIG. 2A, firmware verification circuitry 220 is coupled to the instruction register of instruction decoder 204. As such, the instructions that are being monitored during firmware execution and used in the computation of the cryptographic measurement of the firmware are the decoded instructions (e.g., processor or machine instructions) provided to execution unit 206. Given that this is the stage immediately before execution unit 206, the instructions used in the computation of the cryptographic measurement of the firmware are likely the actual instructions being executed by processor 200. In some implementations, to further increase the confidence that the instructions used in the computation of the cryptographic measurement are the instructions being executed, execution unit 206 can provide an execution completion signal 242 (e.g., GPIO, interrupt, etc.) to firmware verification circuitry 220. Execution completion signal 242 may indicate that the instruction firmware verification circuitry 220 obtained from instruction decoder 204 has been executed, and thus can be included in the cryptographic measurement computation.

In some implementations, firmware verification circuitry 220 can alternatively be coupled to the instruction register of fetch unit 202. In such implementations, the instructions that are being monitored during firmware execution and used in the computation of the cryptographic measurement of the firmware are the binary code of the firmware being executed. Although this is one additional stage preceding the execution unit 206, the cryptographic measurement of the firmware measured at this point of the pipeline inside processor 200 can still provide a higher confidence of what is being executed by processor 200 as compared to techniques that measure the firmware at the non-volatile memory.

Figure 2B:
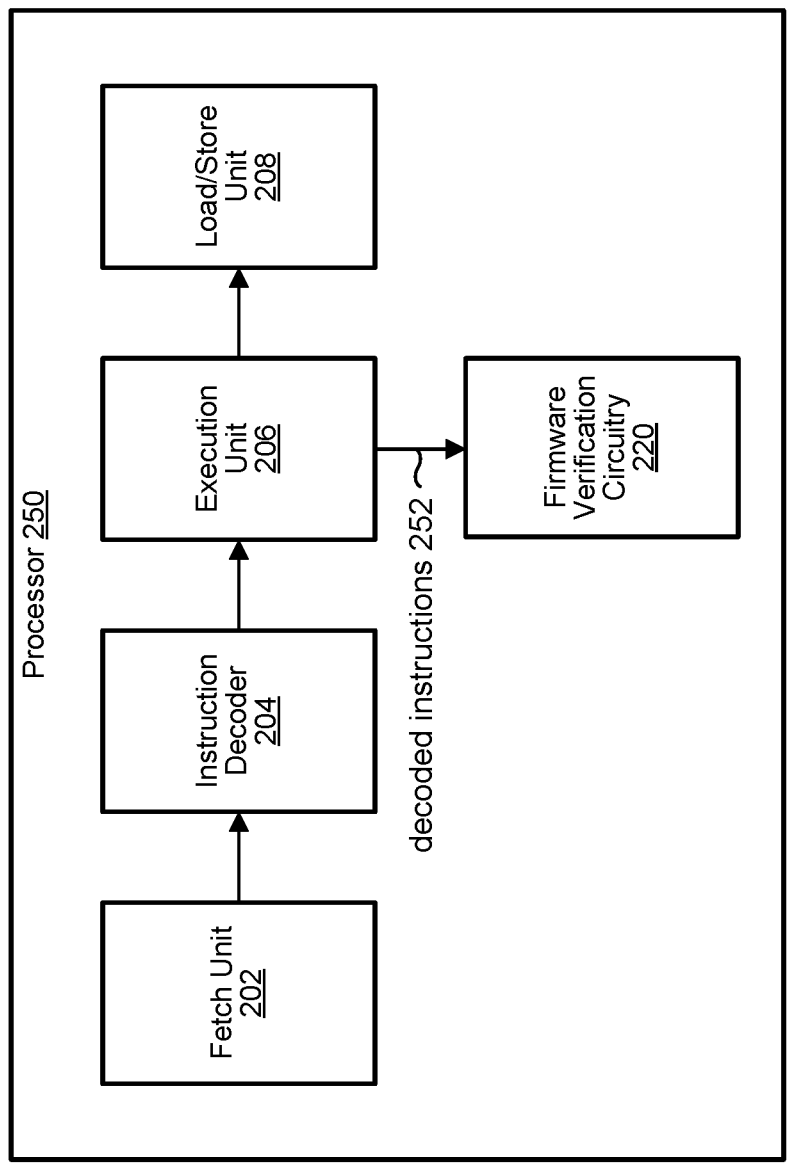
FIG. 2B illustrates another example of a processor, according to certain aspects of the disclosure.

FIG. 2B illustrates a block diagram of another example of a processor 250 of an integrated circuit device. In the example shown in FIG. 2B, firmware verification circuitry 220 is coupled to the instruction register of execution unit 206. As such, the instructions that are being monitored during firmware execution and used in the computation of the cryptographic measurement of the firmware are most likely the actual instructions (e.g., processor or machine instructions) being executed by execution unit 206. This can be used to mitigate against fault injection types of attacks that aim to modify decoded instructions (e.g., flip certain bit(s)) at the moment of execution to bypass checks in the execution flow such as modifying a comparison (CMP) instruction that is used to grant certain access. By consuming the decoded instruction from execution unit 206 rather than earlier in the pipeline, an even higher assurance can be achieved that the instruction being measured is the exact instruction that was executed, and not something that was changed by a malicious attacker at the moment of execution.

It should be noted that in some implementations such as the example shown in FIGS. 2A-2B, the firmware verification circuitry 220 operates in parallel with the execution path or instruction pipeline of the processor. In other words, firmware verification circuitry 220 is not implemented in the execution path or the instruction pipeline, and inclusion of firmware verification circuitry 220 does not add latency or impact the performance or pipeline stages of the processor.

Figure 3:
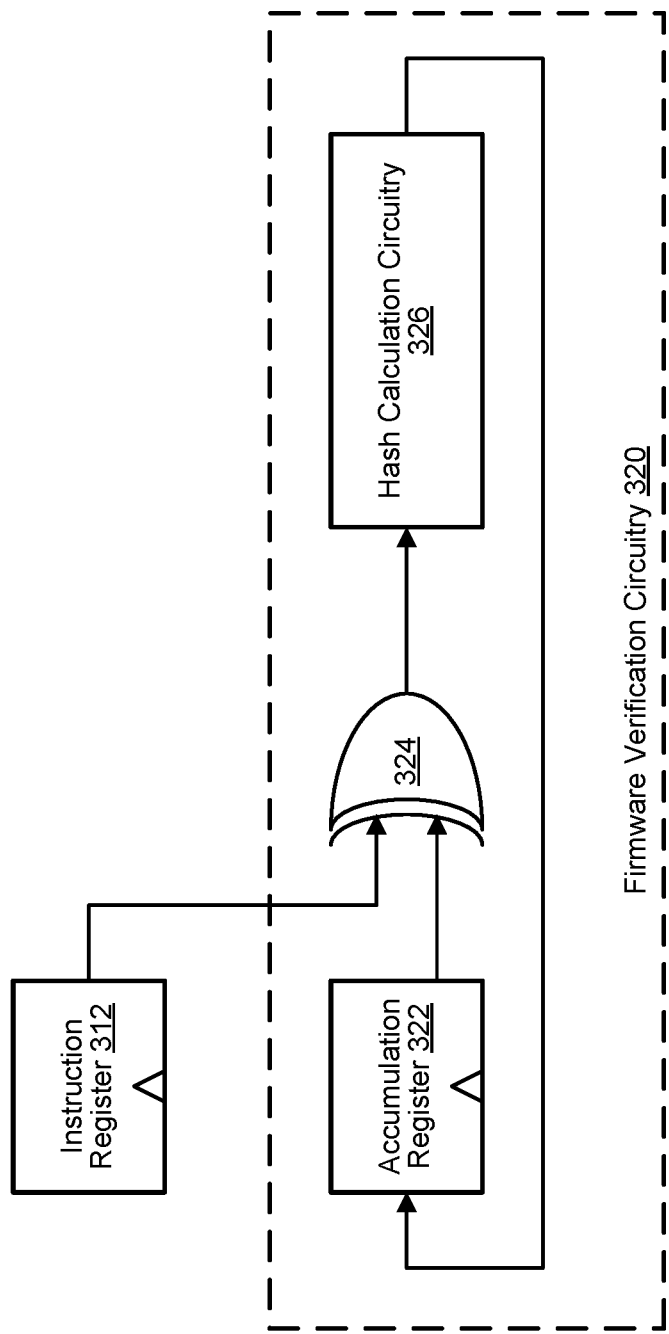
FIG. 3 illustrates an example of a firmware verification circuitry, according to certain aspects of the disclosure.

FIG. 3 illustrates a block diagram of an example of firmware verification circuitry 320, according to some implementations. Firmware verification circuitry 320 can be used, for example, as firmware verification circuitry 120 or 220. Firmware verification circuitry 320 is coupled to an instruction register 312 to obtain a set of instructions corresponding to firmware being executed by a processing unit. Instruction register 312 can be, for example, instruction register 112, instruction register of fetch unit 202, or instruction register of instruction decoder 204, etc.

Firmware verification circuitry 320 can include an accumulation register 322, combinational logic circuitry 324, and hash calculation circuitry 326. Accumulation register 322 is used to store an accumulated value that represents the cryptographic measurement of the firmware when execution of the firmware completes. Accumulation register 322 can be initialized with a default value such as all zeros, all ones, or a seed value that is associated with the firmware or the integrated circuit device executing the firmware. When firmware begins to execute, the value stored in accumulation register 322 is updated by hash calculation circuitry 326 as each new instruction corresponding to the firmware that is written into instruction register 312.

Combinational logic circuitry 324 has a first input coupled to accumulation register 322 and a second input coupled to instruction register 312. Combinational logic circuitry 324 generates an output that is used as a hash input value by combining the value stored in accumulation register 322 with the instruction stored in instruction register 312. For example, in some implementations, combinational logic circuitry 324 can include XOR logic as shown, and the output of the combinational logic circuitry is a bitwise XOR of the value stored in the accumulation register 322 and the instruction stored in the instruction register 312. In some implementations, combinational logic circuitry 324 can perform other combinatory operations to combine the value stored in the accumulation register 322 and the instruction stored in the instruction register 312 to generate the hash input value. Examples of combinatory operations can include mathematical operation(s) (e.g., addition, multiplication, etc.), logical operation(s) (e.g., bitwise XNOR, other bitwise logic combinations of AND, NAND, OR, NOR, XOR, XNOR, etc.); bit-arrangement operation(s) (e.g., shifting, concatenation, etc.), or combinations of such operations.

Hash calculation circuitry 326 can implement a hash function such as a secure hash algorithm (SHA) variant (e.g., SHA-256, SHA-384, SHA-512, etc.), message digest algorithm (MD) variant (e.g., MD6, etc.), or other suitable cryptographic or encryption algorithms (e.g., cryptographic and/or lightweight cryptographic algorithms being considered or standardized by National Institute of Standards and Technology), etc. In some implementations, proprietary cryptographic algorithms can also be implemented. Hash calculation circuitry 326 computes a hash value by applying a hash function to the output of combinational logic circuitry (hash input value), and updates accumulation register 322 with the computed hash value.

For example, when the first firmware instruction is received by instruction register 312, this instruction is combined with the initial value of accumulation register 322 to generate a first hash input value. A first hash value is then computed from this first hash input value, and accumulation register 322 is then updated with the computed first hash value. When the second firmware instruction is received by instruction register 312, this instruction is combined with the current value of accumulation register 322 (the first hash value) to generate a second hash input value. A second hash value is then computed from the second hash input value, and accumulation register 322 is updated with the computed second hash value, and so on. The operation of updating the accumulation register 322 can be expressed as acc=hash (acc^inst), where acc is the value stored in accumulator register 322, hash is the hash function of hash calculation circuitry 326, ^ is the bitwise XOR operator (or other combinatory operation), and inst is the instruction stored in instruction register 312.

Hash calculation circuitry 326 (and hence the update of accumulation register 322) can be enabled in response to firmware verification circuitry 320 receiving a reset indication indicating the start of firmware execution. For example, the reset indication can be the deassertion of a reset or power-on signal, or a certain value of a reset vector provided by a boot management component. Once enabled, hash calculation circuitry 326 can update accumulation register 322 as each instruction of the firmware is written into instruction register 312, for example, in accordance with the operation as described above.

Hash calculation circuitry 326 (and hence the update of accumulation register 322) can be disabled in response to firmware verification circuitry 320 receiving a completion indication indicating that the firmware execution is complete. For example, the completion indication can be an interrupt corresponding to assertion of a power-on-self-test (POST) completion signal, an end-of-file code provided in the last instruction of the set of instructions, or a completion signal provided by a boot management component of the integrated circuit device such as a boot management CPLD. In some implementations, the completion indication can be a completion signal that is asserted when a program counter reaches a value corresponding to the expected number of instructions in the firmware.

Firmware verification circuitry 320 can also implement a timer to assert a timeout interrupt or a timeout signal if the completion indication is not received within a predetermined time period. This may indicate that the firmware being executed is corrupt, and can prevent the integrated circuit device from getting stuck in a hang state during boot. In some implementations, the timeout interrupt or timeout signal can be used, for example, to load a recovery image such as recovery image 162 as described in FIG. 1.

Upon receiving the completion indication indicating that the firmware execution is complete, the accumulated hash value stored in accumulation register 322 can be used as a cryptographic measurement of the firmware to verify that the firmware executed is valid and has not been tampered with. In some implementations, the accumulated hash value can be used for remote attestation of the firmware. For example, the accumulated hash value can be provided via a network interface to a trusted entity (e.g., a remote server) that has the expected signature of the firmware, and the trusted entity can compare the accumulated hash value against the expected signature to verify the firmware. In some implementations, the accumulated hash value can be signed with a private key associated with the processing unit or integrated circuit device executing the firmware, and the signed accumulated hash value can be provided to the trusted entity. The signed accumulated hash value can be provided to the trusted entity with a device identifier such that the trusted entity can retrieve the proper key associated with the processing unit or integrated circuit device to verify the signed accumulated hash value.

In some implementations, the accumulated hash value can be used for local attestation of the firmware. For example, instead of providing the accumulated hash value to a remote server, the accumulated hash value can be provided to a boot management component such as a boot management CPLD or a trusted component. The boot management component or the trusted component can be part of the integrated circuit device (or part of a system that includes the integrate circuit device) executing the firmware, and may perform similar functions as the remote attestation described above to verify the firmware.

Figure 4:
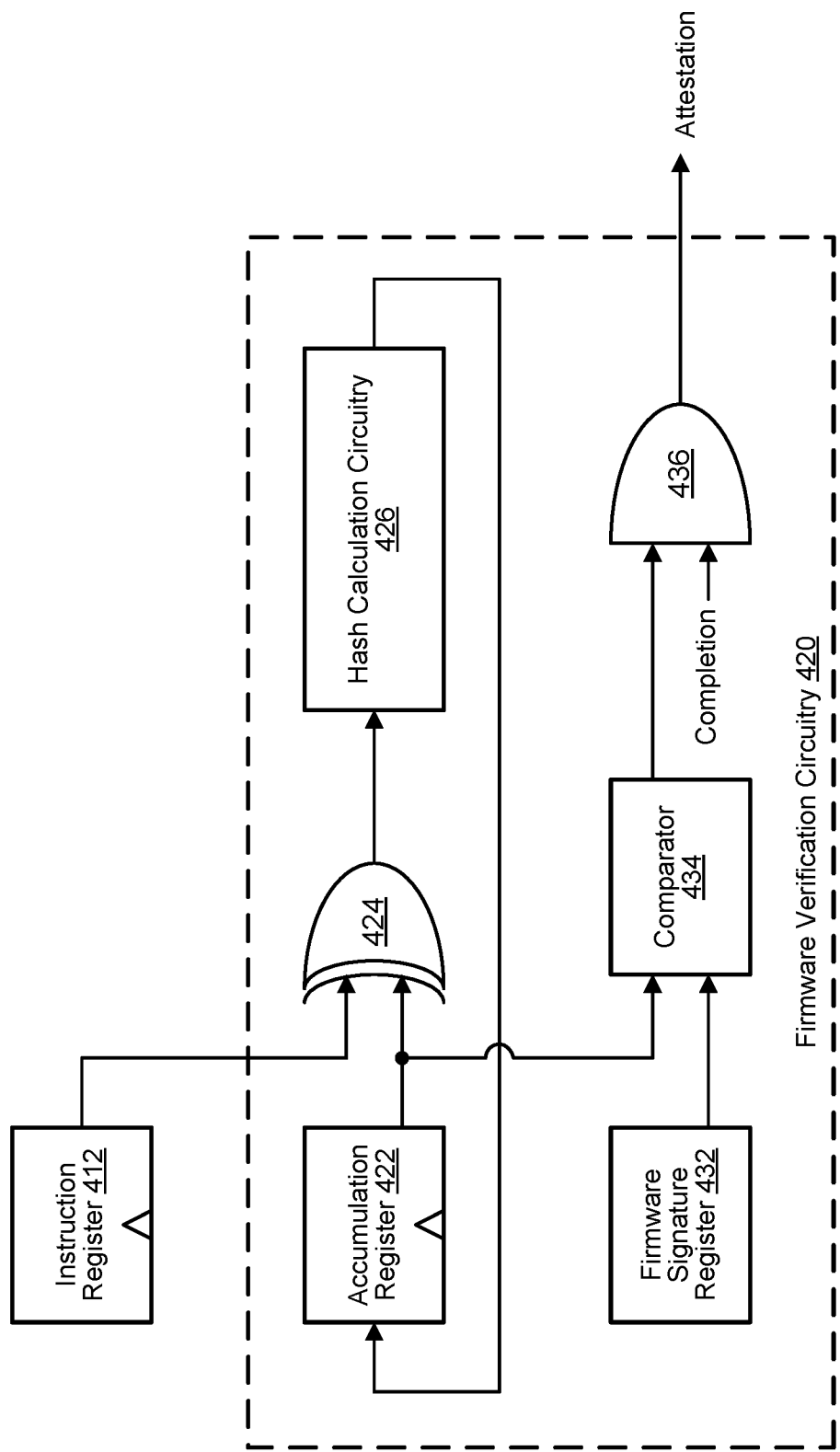
FIG. 4 illustrates another example of a firmware verification circuitry, according to certain aspects of the disclosure.

In some implementations, the firmware verification circuitry or processing unit can include hardware components to perform self-attestation. FIG. 4 illustrates a block diagram of an example of firmware verification circuitry 420 that can perform self-attestation. Components similar to those of firmware verification circuitry 320 have already been described above with reference to FIG. 3, and hence a detailed description of which need not be repeated. Referring to FIG. 4, in addition to accumulation register 422, combinational logic circuitry 424, and hash calculation circuitry 426, firmware verification circuitry 420 also includes a firmware signature register 432, a comparator 434, and an attestation signal generator 436. Firmware signature register 432 is used to store an expected signature of the firmware. Firmware signature register 432 can be provisioned with the expected signature when the firmware is provisioned to the non-volatile memory, and can be updated each time the firmware is updated.

Comparator 434 compares the expected signature with the accumulated hash value stored in accumulated register 422 to determine whether the expected signature matches the accumulated hash value. For example, comparator 434 can be implemented XNOR logic to perform a bitwise XNOR of the expected signature and the accumulated hash value to generate a comparison signal. The comparison signal is asserted if the expected signature stored in firmware signature register 432 matches the accumulated hash value stored in accumulation register 422. Attestation signal generator 436 gates the comparison signal output of comparator 434 with a completion indication indicating that the firmware execution is complete, and generates an attestation signal at the end of firmware execution to indicate whether the cryptographic measurement of the executed firmware matches the expected signature. For example, attestation signal generator 436 can be implemented as a AND gate to assert the attestation signal if the expected signature matches the cryptographic measurement of the firmware (the accumulated hash value) at the end of firmware execution. Assertion of the attestation signal can be used to indicate that the executed firmware is valid to allow the startup process to continue.

It should be understood that comparator 434 and/or attestation signal generator 436 can be implemented using different logic gates to perform their functionalities, for example, depending on the logic level of the attestation signal that is used to indicate valid firmware. Moreover, one or more of firmware signature register 432, comparator 434, and attestation signal generator 436 can be implemented in a component external to the firmware verification circuitry.

For example, one or more of firmware signature register 432, comparator 434, and attestation signal generator 436 can be implemented as part of the processing unit executing the firmware, as part of the integrated circuit device, or as part of a component external to the integrated circuit device.

Figure 5:
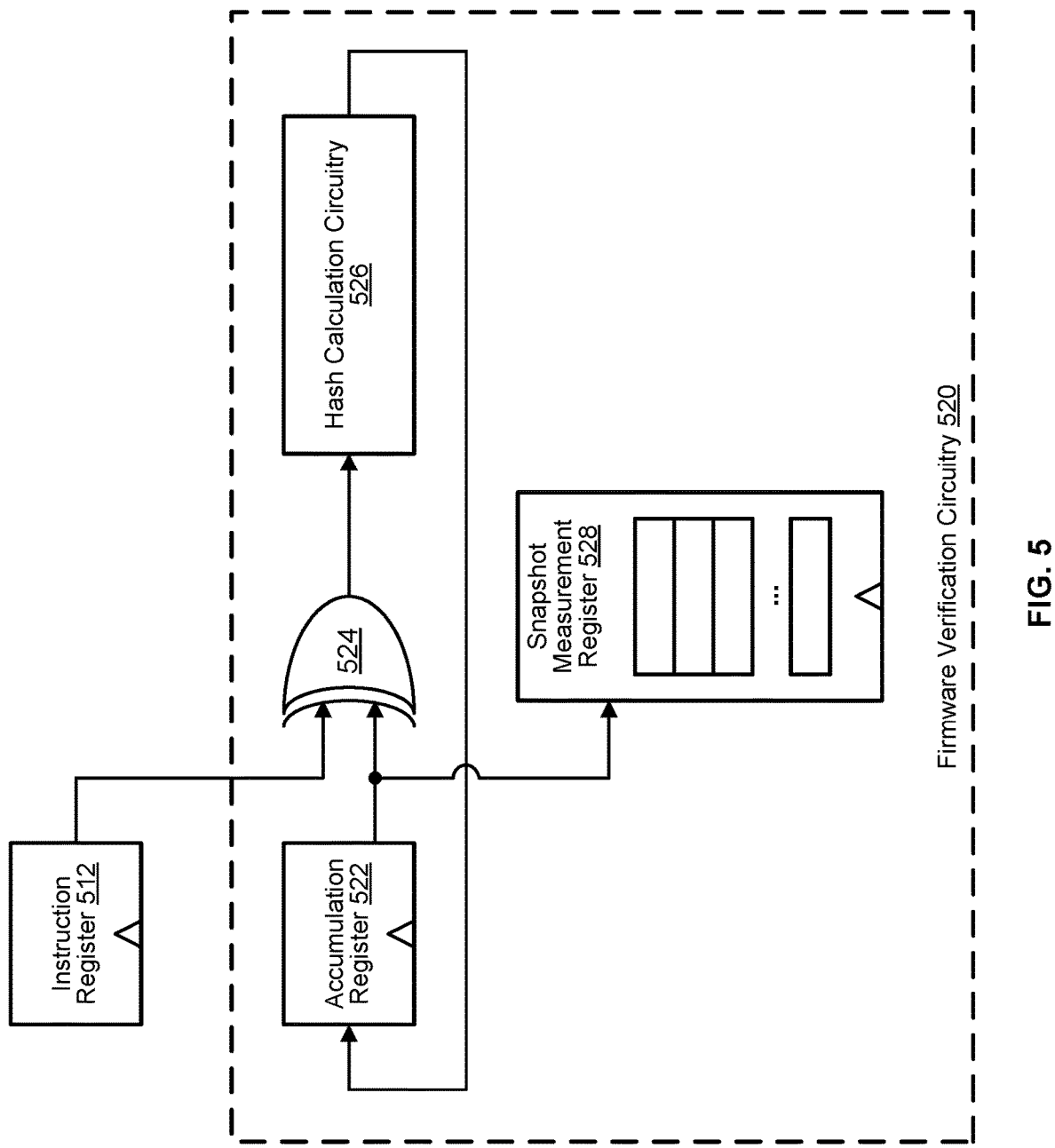
FIG. 5 illustrates a further example of a firmware verification circuitry, according to certain aspects of the disclosure.

In some implementations, the firmware verification circuitry can be used to provide multiple snapshot measurements of the firmware being executed. This can be used to perform intermediate checks on the firmware before execution of the firmware completes such that rogue code can be halted before finishing. FIG. 5 illustrates a block diagram of an example of firmware verification circuitry 520 that can provide multiple snapshot measurements of the firmware. Components similar to those of firmware verification circuitry 320 have already been described above with reference to FIG. 3, and hence a detailed description of which need not be repeated. Referring to FIG. 5, in addition to accumulation register 522, combinational logic circuitry 524, and hash calculation circuitry 526, firmware verification circuitry 520 also includes a snapshot measurement register 528.

Snapshot measurement register 528 can include multiple entries to store intermediate values from accumulation register 522. The intermediate values can be selected periodically (e.g., every $n^{th}$ firmware instruction), or selected based on the different stages of firmware execution (e.g., such that an intermediate check is performed at each stage). A counter such as a program counter can be used to indicate at which instruction that the intermediate value stored in accumulation register 522 should be copied to snapshot measurement register 528. For example, if the intermediate values are selected periodically such as every $32^{th}$ instruction, a counter that counts to 32 can be implemented. At every rollover of the counter, the intermediate value stored in accumulation register 522 is copied to an entry in snapshot measurement register 528. If the program counter is used, the intermediate value stored in accumulation register 522 is copied to an entry in snapshot measurement register 528 at every program counter value that is a multiple of 32. For specific instructions at different stages of the firmware execution, specific program counter values corresponding to those instructions can be used to trigger copying of the intermediate value stored in accumulation register 522 to an entry in snapshot measurement register 528. In some implementations, a codeword can also be embedded into the firmware instruction to trigger copying of the intermediate value stored in accumulation register 522 to an entry in snapshot measurement register 528.

A corresponding set of expected values for the different snapshot measurements of the firmware can be implemented, for example, as part of the processing unit, as part of the integrated circuit device, or as part of a component external to the integrated circuit device. The expect values can be provisioned whenever new firmware is provisioned. As the firmware is being executed, when execution reaches an intermediate point targeted for checking, the entry in snapshot measurement register 528 for that intermediate point can be read and compared with the corresponding expected value. If the snapshot measurement mismatches the corresponding expected value, an interrupt or a halt signal can be asserted to stop execution of the firmware code to take corrective actions (e.g., load a recovery image). In some implementations, circuitry for self-attestation such as those described with reference to FIG. 4 can also be implemented to verify the intermediate points during firmware execution.

Figure 6:
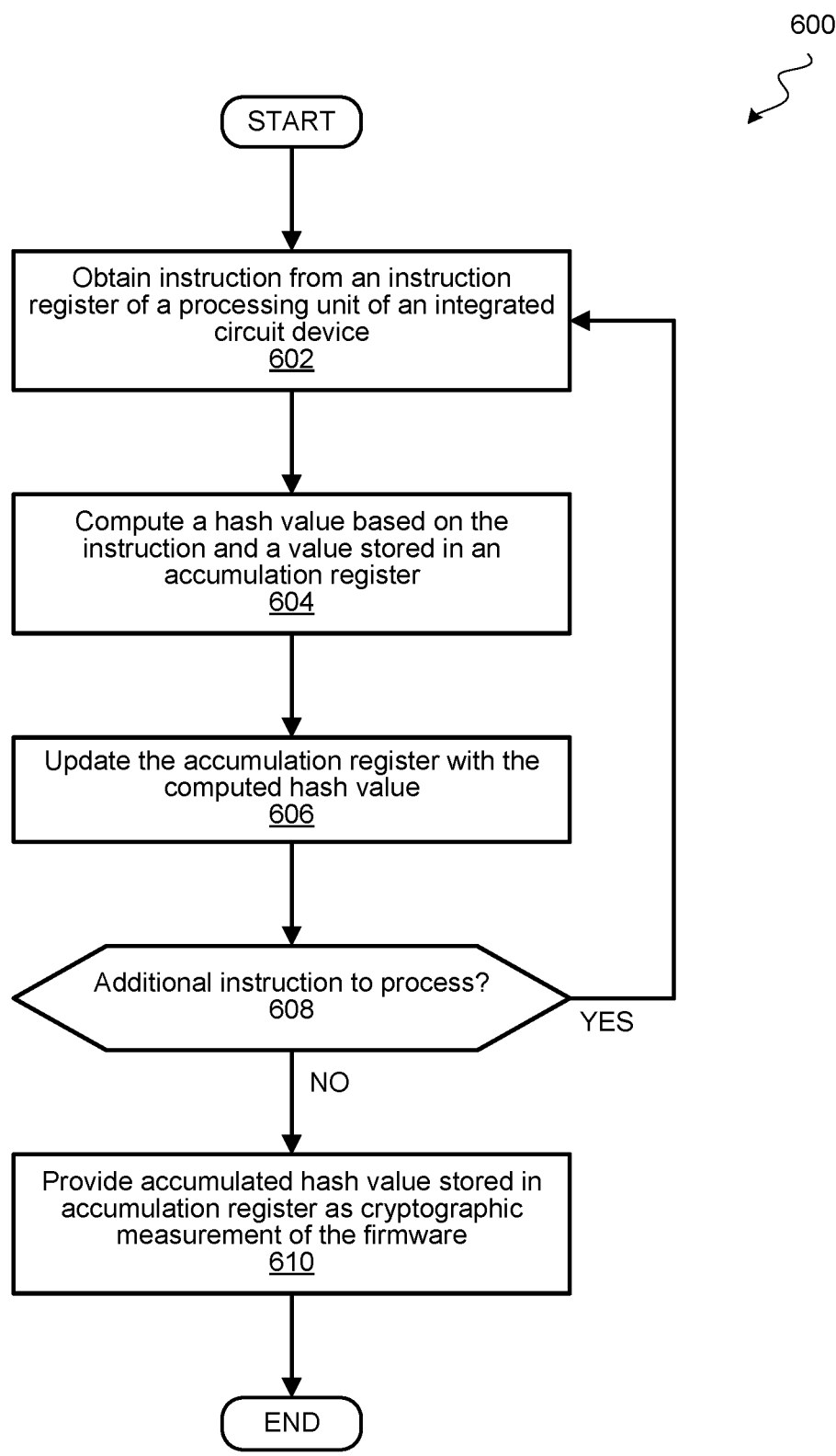
FIG. 6 illustrates an example of a process for computing a cryptographic measurement of firmware, according to certain aspects of the disclosure.

FIG. 6 illustrates a flow diagram of an example of a process 600 for computing a cryptographic measurement of firmware, according to some implementations. Process 600 can be used to obtain a set of instructions corresponding to firmware being executed by a processing unit of an integrated circuit device (e.g., integrated circuit device 100) during a boot sequence. For each of the instructions corresponding to the firmware, firmware verification circuitry (e.g., firmware verification circuitry 120, 220, 320, 420, or 520) implemented in the integrated circuit device can sequentially compute a hash value based on the instruction and a value stored in an accumulation register, and update the accumulation register with the hash value. When all instructions have been processed (e.g., when the accumulated register has been updated with the hash value computed based on the last instruction of the firmware), the accumulated hash value stored in the accumulation register is provided as the cryptographic measurement of the firmware. The cryptographic measurement of the firmware can be used to verify the integrity of the firmware.

Process 600 can be initiated by receiving a reset indication indicating initiation of a boot sequence. For example, the reset indication can be the deassertion of a reset or power-on signal, or a certain value of a reset vector provided by a boot management component indicating the start of firmware execution. In response to receiving the reset indication, the firmware verification circuitry can be enabled to facilitate performance of process 600.

At block 602, an instruction corresponding to the firmware being executed is obtained from an instruction register of a processing unit of the integrated circuit device. The instruction may correspond to the firmware code (e.g., binary code) read from a memory location of a non-volatile memory, or can be a processor or machine instruction decoded from the firmware code.

In some implementations, the instruction register can be an instruction register implemented in the instruction pipeline of the processing unit executing the firmware (e.g., instruction register in the fetch unit, instruction decoder, or execution unit, etc. of a processor or controller). In some implementations, the instruction register can be implemented elsewhere in the processing unit.

At block 604, firmware verification circuitry computes a hash value based on the instruction obtained from the instruction register and a value stored in an accumulation register. For example, the instruction can be combined with the value in the accumulation register using a combinatory operation to generate a hash input value. The combinatory operation can be, for example, a bitwise XOR operation, concatenation, or other mathematical, logical, or bit-arrangement operation, or a combination of one or more such operations, etc. A hash function can then be applied to the hash input value to generate the hash value. The hash function being applied can be, for example, a secure hash algorithm (SHA), a message digest algorithm (MD), or other suitable cryptographic or encryption algorithm.

At block 606, the accumulation register is updated with the computed hash value from block 604. For example, the previous value stored in the accumulation register can be replaced with the newly computed hash value. In some implementations, the accumulation register can be updated with the computed hash value by combining the previously stored value with the newly computed hash value. The computed hash value can be combined with the previously stored value, for example, by using a mathematical, logical, or bit-arrangement operation, or a combination of one or more such operations. It should be noted that the accumulation register can be updated while the firmware is being executed by the processing unit. In other words, the accumulation register is updated on-the-fly as each instruction of the firmware is being executed.

At block 608, a determination is made as to whether there are any additional instruction corresponding to the firmware to process. The determination can be made, for example, by determining whether a completion indication has been received. The completion indication may indicate that the execution of firmware is complete. For example, the completion indication can be an interrupt corresponding to assertion of a power-on-self-test (POST) completion signal, an end-of-file code provided in an instruction being processed, a completion signal provided by a boot management component of the integrated circuit device, or a completion signal corresponding to a program counter reach a certain value. If there is an additional instruction to process (e.g., the completion indication has not yet been received), process 600 returns to block 602 to obtain the next instruction from the instruction register. If there is no additional instruction to process (e.g., the completion indication has been received), process 600 continues to block 610.

At block 610, after each instruction of the firmware code has been processed, the accumulated hash value stored in the accumulated register is provided as the cryptographic measurement of the firmware executed by the processing unit. The firmware verification circuitry can also be disabled in response to receiving the completion indication to stop updating the accumulation register. At this point, the cryptographic measurement of the firmware has been computed, and process 600 is complete.

Upon completion of process 600, the accumulation hash value stored in the accumulation register (cryptographic measurement of the executed firmware) is compared with an expected signature of the firmware to verify that the firmware executed by the processing unit is valid and has not been tampered with. The comparison can be performed locally within the processing unit, within the integrated circuit device, or within a system that includes the integrated circuit device, or the comparison can be performed remotely as part of a remote attestation service. In some implementations, the accumulated hash value can be signed with a private key associated with the integrated circuit device, and the signed accumulated hash value can be provided to a trusted entity for attestation of the firmware executed by the processing unit.

If the firmware executed by the processing unit is verified (e.g., the accumulated hash value matches the expected signature of the firmware), an attestation signal can be asserted to allow a startup process of the integrated circuit device to continue. If the firmware executed by the processing unit is not verifiable (e.g., the accumulated hash value mismatches the expected signature of the firmware and the cryptographic measurement of the firmware is determined to be invalid), the startup process of the integrated circuit device can be halted to take corrective actions. For example, the integrated circuit device can be prevented from joining a network or accessing certain resources. An alarm or interrupt can be generated to prevent further code execution or to shut down the integrated circuit device. In some implementations, the firmware stored in the non-volatile memory can be overwritten with a recovery image that is stored on a separate non-volatile memory.

In some implementations, instead of waiting until firmware execution is complete to check the firmware, a set of intermediate hash values corresponding to blocks of instructions (or stages) that are part of the firmware image being executed by the integrated circuit device can also be provided as snapshot measurements of the firmware. This may allow intermediate points during execution of the firmware to be checked such that malicious code in the firmware can be detected before the malicious code fully executes. Similar corrective actions can be taken if an intermediate point of firmware execution indicates that the firmware being execute may be corrupt.

Figure 7:
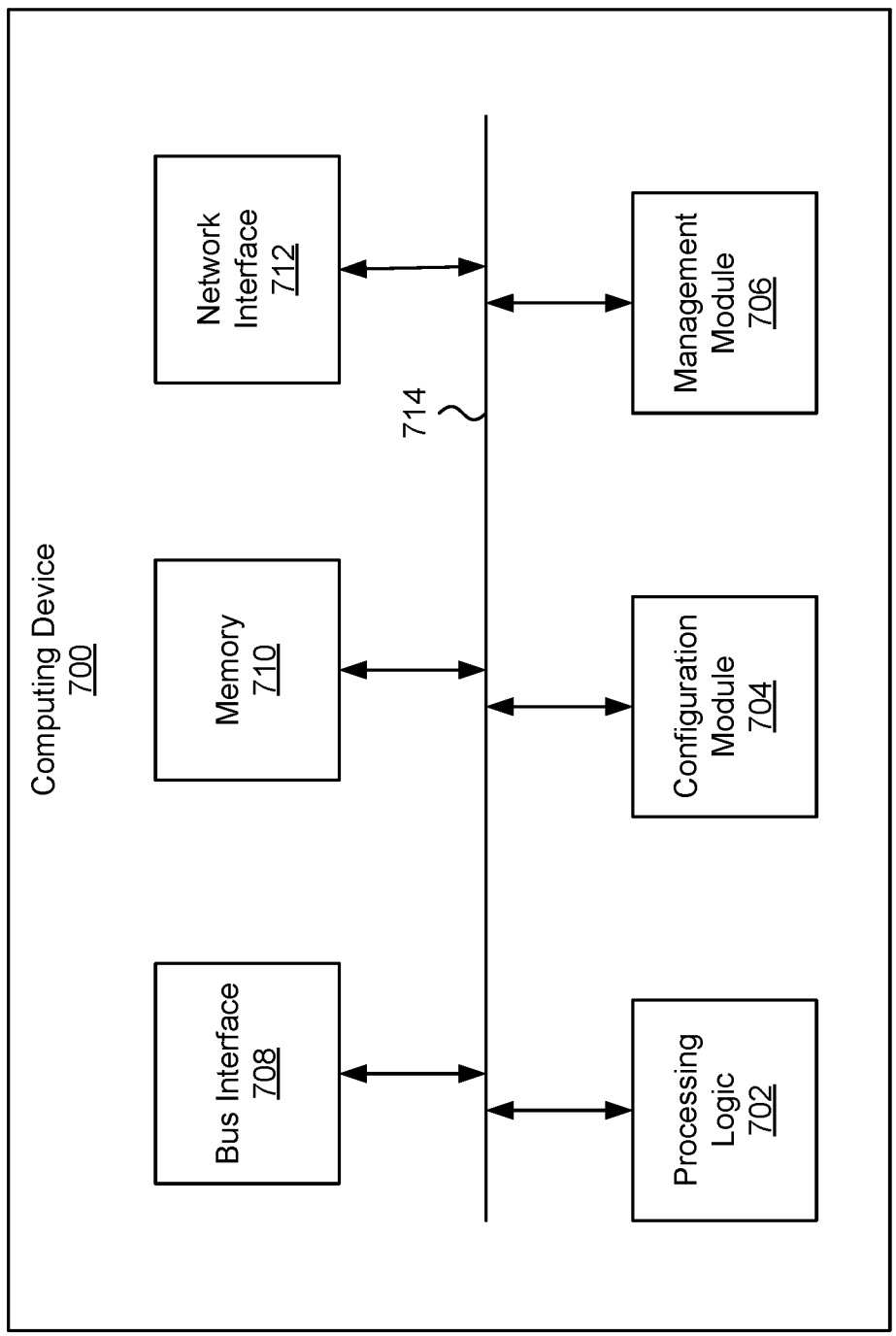
FIG. 7 illustrates an example of a computing device, according to certain aspects of the disclosure.

FIG. 7 illustrates an example of a computing device 700. In some implementations, computing device 700 can be integrated circuit device 100 or can include integrated circuit device 100. In one example, the computing device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMID®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
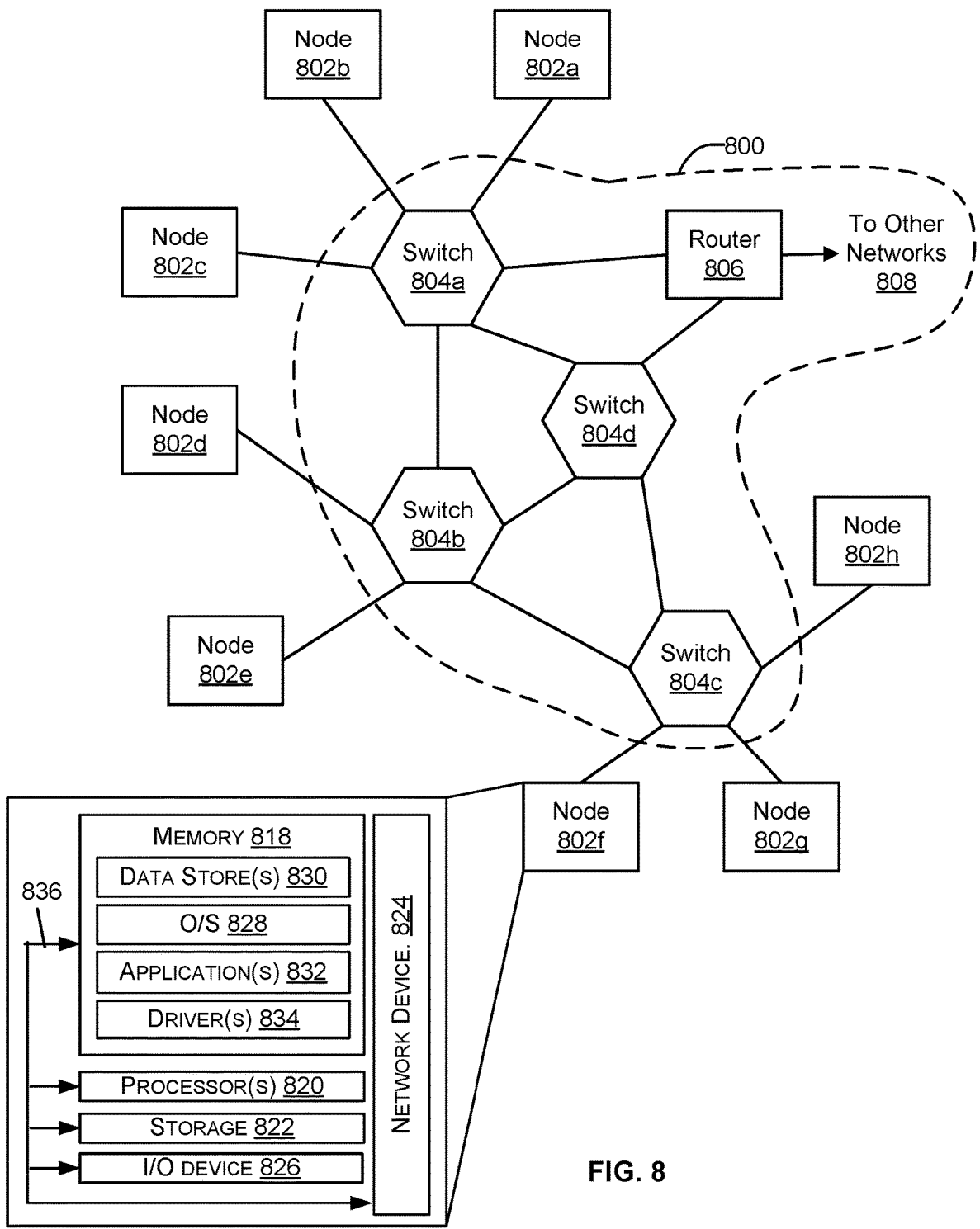
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices that can communicate with computing device 700, such as nodes comprising implementations of the computing device, switches and routers. In some implementations, one or more computing devices connected to the network can provide remote firmware attestation services to other components on the network. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more computing devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third-party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device comprising:
    a non-volatile memory configured to store firmware for execution during a boot sequence; and
    a processor having:
        fetch circuitry configured to read the firmware from the non-volatile memory during the boot sequence;
        instruction decoder circuitry configured to decode the firmware into processor instructions;
        execution circuitry configured to execute the processor instructions;
        an instruction register configured to sequentially store each of the processor instructions corresponding to the firmware; and
        firmware verification circuitry including an accumulation register, the firmware verification circuitry configured to sequentially perform, for each of the processor instructions corresponding to the firmware, operations including:

combining the processor instruction stored in the instruction register with a value stored in the accumulation register to generate a hash input value;

applying a hash function to the hash input value to compute a hash value; and updating the accumulation register with the hash value, wherein an accumulated hash value stored in the accumulation register corresponding to a last processor instruction of the firmware is used as a cryptographic measurement of the firmware to verify that the firmware executed by the processor is valid, and wherein the firmware verification circuitry is disabled in response to a completion indication indicating that execution of the firmware is complete.

2. The integrated circuit device of claim 1, further comprising:

a firmware signature register configured to store an expected signature of the firmware; and a comparator configured to compare the expected signature with the accumulated hash value.

3. The integrated circuit device of claim 2, further comprising:

a second non-volatile memory storing a recovery image, wherein the firmware is overwritten with the recovery image when the expected signature of the firmware does not match the accumulated hash value.

4. The integrated circuit device of claim 1, wherein the accumulated hash value is used for remote attestation of the firmware.

5. A method comprising:

obtaining a set of instructions from an instruction register of a processing unit of an integrated circuit device, the set of instructions corresponding to firmware being executed by the processing unit during a boot sequence;

for each instruction in the set of instructions, sequentially performing, by firmware verification circuitry, operations including:

computing a hash value based on the instruction and a value stored in an accumulation register; and updating the accumulation register with the hash value;

providing an accumulated hash value stored in the accumulation register corresponding to a last instruction of the set of instructions as a cryptographic measurement of the firmware;

receiving a completion indication indicating that execution of the firmware is complete; and in response to receiving the completion indication, disabling the firmware verification circuitry.

6. The method of claim 5, further comprising:

receiving a reset indication indicating initiation of the boot sequence; and in response to receiving the reset indication, enabling the firmware verification circuitry.

7. The method of claim 5, wherein the completion indication is an interrupt corresponding to assertion of a power-on-self-test (POST) completion signal.

8. The method of claim 5, wherein the completion indication is an end-of-file code provided in the last instruction of the set of instructions.

9. The method of claim 5, wherein the completion indication is provided by a boot management component of the integrated circuit device.

10. The method of claim 5, further comprising:

comparing the accumulation hash value with an expected signature of the firmware to verify that the firmware executed by the processing unit is valid.

11. The method of claim 10, further comprising:

in response to verifying that the firmware executed by the processing unit is valid, asserting an attestation signal to allow a startup process of the integrated circuit device to continue.

12. The method of claim 5, further comprising:

signing the accumulated hash value with a private key associated with the integrated circuit device; and providing the signed accumulated hash value to a trusted entity for attestation of the firmware executed by the processing unit.

13. The method of claim 5, further comprising:

determining that the cryptographic measurement of the firmware is invalid; and overwriting the firmware with a recovery image.

14. The method of claim 5, further comprising:

providing a set of intermediate hash values corresponding to blocks of instructions in the set of instructions as snapshot measurements of the firmware.

15. The method of claim 5, wherein the accumulation register is updated while the firmware is being executed by the processing unit.

16. An integrated circuit device comprising:

an accumulation register;

combinational logic circuitry having a first input coupled to the accumulation register and a second input coupled to an instruction register, the combinational logic circuitry configured to generate an output that combines a value stored in the accumulation register with an instruction stored in the instruction register; and hash calculation circuitry configured to compute a hash value of the output of the combinational logic circuitry, and update the accumulation register with the hash value, wherein the hash calculation circuitry is enabled in response to a reset indication indicating a start of firmware execution, and is disabled in response to a completion indication indicating that the firmware execution is complete.

17. The integrated circuit device of claim 16, wherein the combinational logic circuitry includes XOR logic, and the output of the combinational logic circuitry is a XOR of the value stored in the accumulation register and the instruction stored in the instruction register.

18. The integrated circuit device of claim 16, further comprising:

a firmware signature register configured to store an expected signature of the firmware; and a comparator configured to compare the expected signature and an accumulated hash value stored in the accumulation register.

* * * * *